(12) United States Patent
Zhou et al.

(10) Patent No.: US 11,106,118 B2
(45) Date of Patent: *Aug. 31, 2021

(54) MOTOR, GIMBAL HAVING THE MOTOR, AND IMAGE CAPTURING DEVICE HAVING THE GIMBAL

(71) Applicant: SZ DJI OSMO TECHNOLOGY CO., LTD., Shenzhen (CN)

(72) Inventors: Li Zhou, Shenzhen (CN); Peng Wang, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/692,447

(22) Filed: Nov. 22, 2019

(65) Prior Publication Data

US 2020/0089086 A1    Mar. 19, 2020

Related U.S. Application Data

(63) Continuation of application No. 15/115,422, filed as application No. PCT/CN2014/081613 on Jul. 3, 2014, now Pat. No. 10,488,739.

(30) Foreign Application Priority Data

Feb. 28, 2014   (CN) ......................... 201410070502.1

(51) Int. Cl.
   *G03B 17/56*      (2021.01)
   *F16M 11/06*     (2006.01)
   (Continued)

(52) U.S. Cl.
   CPC ........... *G03B 17/561* (2013.01); *F16M 11/06* (2013.01); *F16M 11/18* (2013.01); *H02K 1/27* (2013.01);
   (Continued)

(58) Field of Classification Search
   None
   See application file for complete search history.

(56) References Cited

U.S. PATENT DOCUMENTS 10,488,739 B2 *  11/2019  Zhou ........................ H02K 1/27
2002/0093257 A1 *  7/2002  Horng ..................... H02K 11/33
                                                        310/68 B
(Continued)

FOREIGN PATENT DOCUMENTS

CN       200987089 Y     12/2007
CN       201185382 Y     1/2009
(Continued)

OTHER PUBLICATIONS

EPO Machine Translation of WO2013002103A1. Access date Nov. 29, 2019.
(Continued)

*Primary Examiner* — Clayton E. LaBalle
*Assistant Examiner* — Dennis Hancock
(74) *Attorney, Agent, or Firm* — Anova Law Group, PLLC

(57) ABSTRACT

A method includes using a Hall angular displacement sensor to detect a magnetic field strength generated by a magnet disposed on a first end of a rotating shaft of a motor assembly of a gimbal. The sensor is disposed on a side of an electrical connecting device in a first rotating member of the gimbal that faces away from the magnet. The method further includes determining a rotational angle of a rotor of the motor assembly with respect to a stator of the motor assembly based on the magnetic field strength. The stator is coupled to the first rotating member. The rotor is coupled to a second rotating member of the gimbal and disposed on a second end of the rotating shaft. The method also includes determining a positional relationship between the first rotat- (Continued)

ing member and the second rotating member based on the rotational angle.

20 Claims, 4 Drawing Sheets

(51) Int. Cl.
    *F16M 11/18*     (2006.01)
    *H02K 11/215*     (2016.01)
    *H02K 29/08*     (2006.01)
    *H02K 1/27*     (2006.01)
    *H04N 5/232*     (2006.01)

(52) U.S. Cl.
    CPC .......... *H02K 11/215* (2016.01); *H02K 29/08* (2013.01); *H04N 5/23287* (2013.01); *F16M 2200/041* (2013.01)

(56) References Cited

U.S. PATENT DOCUMENTS

| | | | |
|---|---|---|---|
| 2003/0059212 A1 | 3/2003 | Desbiolles et al. | |
| 2006/0232148 A1 | 10/2006 | Chen | |
| 2007/0183907 A1* | 8/2007 | Serowy | H02K 7/085 417/354 |
| 2010/0019120 A1* | 1/2010 | Burnham | F41A 27/14 248/550 |
| 2010/0196174 A1 | 8/2010 | Lee | |
| 2010/0231069 A1* | 9/2010 | Liao | H02K 7/1025 310/77 |
| 2010/0244637 A1 | 9/2010 | Yoshikawa et al. | |
| 2012/0104903 A1 | 5/2012 | Tang | |
| 2012/0176073 A1 | 7/2012 | Amagasa | |
| 2012/0229005 A1 | 9/2012 | Tominaga et al. | |
| 2013/0099609 A1 | 4/2013 | Ikeno | |
| 2013/0342086 A1 | 12/2013 | Jang | |
| 2014/0105768 A1 | 4/2014 | Franz et al. | |
| 2014/0145564 A1* | 5/2014 | Taniguchi | H02K 5/1732 310/68 B |
| 2015/0077033 A1 | 3/2015 | Lee | |
| 2015/0333600 A1* | 11/2015 | Nakano | H02K 11/33 310/71 |

FOREIGN PATENT DOCUMENTS

| | | |
|---|---|---|
| CN | 201315525 Y | 9/2009 |
| CN | 101802415 A | 8/2010 |
| CN | 201830125 U | 5/2011 |
| CN | 102545524 A | 7/2012 |
| CN | 102594028 A | 7/2012 |
| CN | 202647109 A | 1/2013 |
| CN | 102947609 A | 2/2013 |
| CN | 103066787 A | 4/2013 |
| CN | 103516141 A | 1/2014 |
| CN | 103547133 A | 1/2014 |
| CN | 103825408 A | 5/2014 |
| CN | 203722420 U | 7/2014 |
| EP | 2549627 A1 | 1/2013 |
| EP | 3086451 A1 | 10/2016 |
| JP | 20030189546 A | 7/2003 |
| JP | 20090153309 A | 7/2009 |
| JP | 2010039350 A | 2/2010 |
| JP | 2010136588 A | 6/2010 |
| JP | 20120147519 A | 8/2012 |
| JP | 2013011538 A | 1/2013 |
| WO | 20060065892 A2 | 6/2006 |
| WO | 2013002103 A1 | 1/2013 |

OTHER PUBLICATIONS

Ji Xuewu et al., Permanent Magnet Synchronous Motor with Magnetic Rotary Encoder Application of Position Measurement. Electric Drive. Feb. 29, 2008, p. 6-8. vol. 38. Beijing, CN.
An Office Action issued by the State Intellectual Property Office of the People's Republic of China ("SIPO Office Action") dated Sep. 5, 2016 regarding Chinese patent application No. 201410070502.1.
An Office Action issued by the State Intellectual Property Office of the People's Republic of China ("SIPO Office Action") dated Feb. 3, 2016 regarding Chinese patent application No. 201410070502.1.
An International Search Report and Written Opinion of PCT application PCT/CN2014/081613 dated Sep. 3, 2015.
English-language extended Search Report from the European Patent Office in counterpart European Application No. EP 14863771 dated Jan. 16, 2017.

\* cited by examiner

US 11,106,118 B2

MOTOR, GIMBAL HAVING THE MOTOR, AND IMAGE CAPTURING DEVICE HAVING THE GIMBAL

CROSS-REFERENCE TO RELATED APPLICATIONS

This application is a continuation of application Ser. No. 15/115,422, filed Jul. 29, 2016, which is a National Stage Entry of International Application No. PCT/CN2014/081613, filed Jul. 3, 2014, which claims priority to Chinese Application No. 201410070502.1, filed Feb. 28, 2014, the entire contents of all of which are incorporated herein by reference.

TECHNICAL FIELD

The present disclosure relates to a motor, a gimbal having the motor and an image capturing device having the gimbal.

BACKGROUND OF THE DISCLOSURE

An image capturing device generally comprises a gimbal and an image capturing apparatus carried on the gimbal. The gimbal is configured to fix the image capturing device, freely adjust an attitude of the image capturing apparatus (e.g., changing an elevation and/or orientation of the image capturing apparatus) and stably maintain the image capturing apparatus at a determined attitude to achieve a stable, smooth and multi-angle image capturing. The image capturing apparatus may be a camcorder or a camera.

The gimbal comprises a motor. The motor is provided with a stator, a rotor and a sensor for sensing relative positions of the rotor with respect to the stator of the motor. The prior art sensor generally includes an encoder and a potentiometer, where the encoder has a high precision but a large volume, a high cost and a certain frictional resistance, and the potentiometer has a low precision but a greater frictional resistance, which significantly affects the controlling of the gimbal. Both sensors are contact type sensors, resulting in a great frictional resistance and poor electrical contact.

SUMMARY OF THE DISCLOSURE

An object of the disclosure is to provide a motor having a low frictional resistance, a gimbal having the motor, and an image capturing device having the gimbal.

The aforementioned object may be achieved by various embodiments of the disclosure.

In some embodiments, a motor may comprise a stator, a rotator rotatably connected with the stator, and an electrical connecting device for providing an electric signal for the motor. The motor may further comprise a magnet fixed on the rotator, and a Hall angular displacement sensor fixed on the electrical connecting devices and arranged opposite to the magnet. The magnet and the Hall angular displacement sensor may be spaced from each other by the electrical connecting devices.

In some embodiments, a gimbal may comprise a first rotating member, a second rotating member rotatably connected with the first rotating member, and a motor configured to drive the second rotating member to rotate with respect to the first rotating member. The motor may comprise a stator, a rotator rotatably connected with the stator, and an electrical connecting device for providing an electric signal to the motor. The motor further comprises a magnet fixed on the rotator, and a Hall angular displacement sensor fixed on the electrical connecting device and arranged opposite to the magnet. The magnet and the Hall angular displacement sensor may be spaced from each other by the electrical connecting device.

In some embodiments, an image capturing device may comprise a gimbal and a payload carried on the gimbal. The gimbal may comprise a first rotating member, a second rotating member rotatably connected with the first rotating member, and a motor configured to drive the second rotating member to rotate with respect to the first rotating member. The motor may comprise a stator, a rotator rotatably connected with the stator, and an electrical connecting device configured to provide an electric signal to the motor. The motor may further comprise a magnet fixed on the rotator, and a Hall angular displacement sensor fixed on the electrical connecting device and arranged opposite to the magnet. The magnet and the Hall angular displacement sensor may be spaced from each other by the device.

As compared with the prior art, a method of detecting a positional relationship between the stator and the rotator by a non-contact Hall angular displacement sensor is provided in the present disclosure, which solves the great frictional resistance problem in conventional detection methods.

DETAILED DESCRIPTION OF THE EMBODIMENTS

The image capturing device in embodiments of the present disclosure may be used as an auxiliary device for photographing, image capturing, monitoring and sampling, and can be carried on an air-based vehicle (e.g., a rotor wing aircraft or a fixed wing aircraft), a water-based vehicle (e.g., a submarine or a ship), a road-based vehicle (e.g., an automobile) or a space-based vehicle (e.g., a satellite, a space station, or a spaceship) and the like. The image capturing device may comprise a gimbal and a payload carried on the gimbal. The gimbal may be configured to fix the payload, freely adjust an attitude of the payload (e.g., to change an elevation, an inclination angle and/or an orientation of the payload), and stably maintain the carried payload at a determined attitude. The payload may be an image capturing device such as a camera or a camcorder. Alternatively, the payload may also be a sensor or the like. In this embodiment, the image capturing device may be carried by an aircraft. The payload may be an interchangeable lens digital camera (ILDC), a surveillance camera or the like. The image capturing device according to the present disclosure will be described below in detail with reference to the accompanying drawings.

Figure 1:
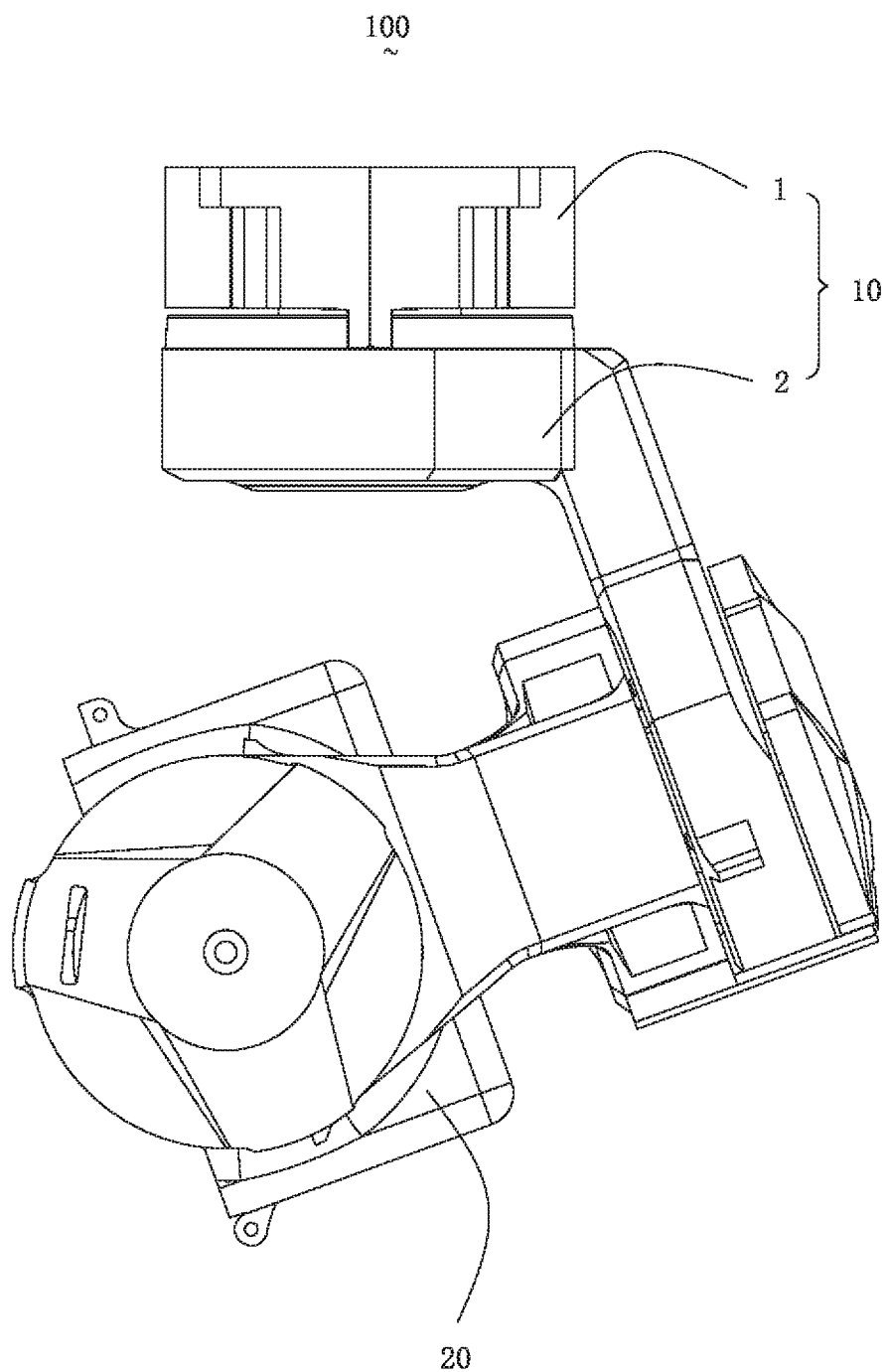
FIG. 1 is a perspective view of an image capturing device according to the disclosure.
Figure 2:
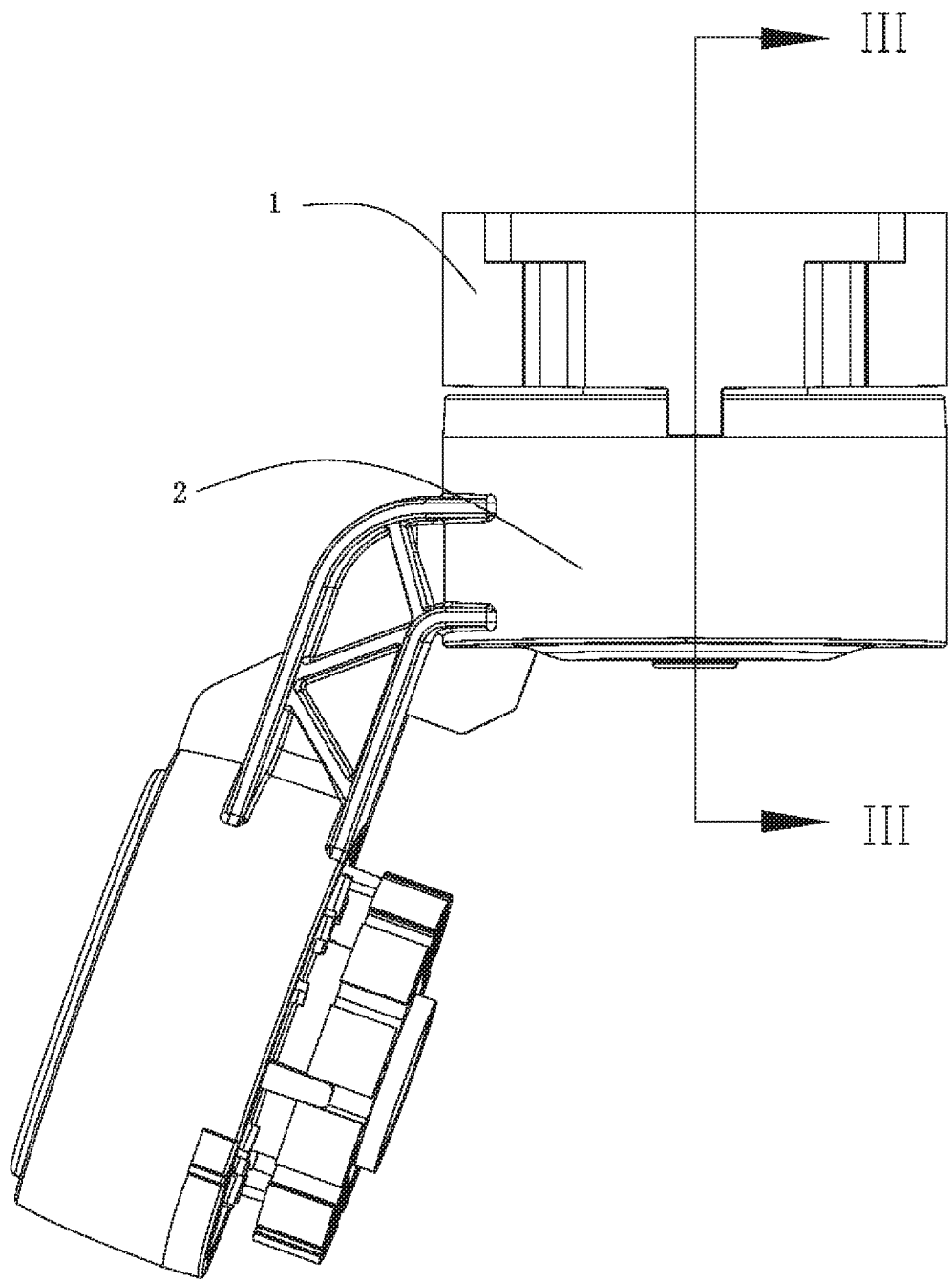
FIG. 2 is a perspective view of the image capturing device from which the carried payload is removed according to the disclosure.
Figure 3:
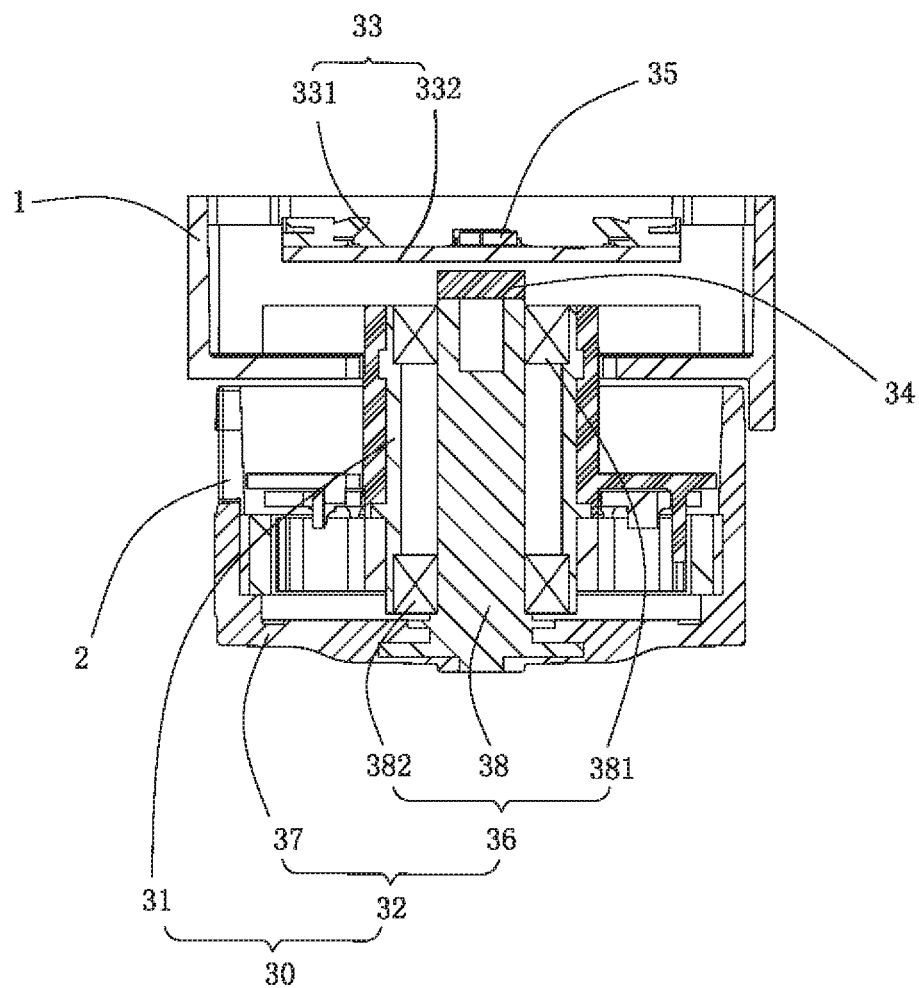
FIG. 3 is a sectional view of FIG. 2 along the line.
Figure 4:
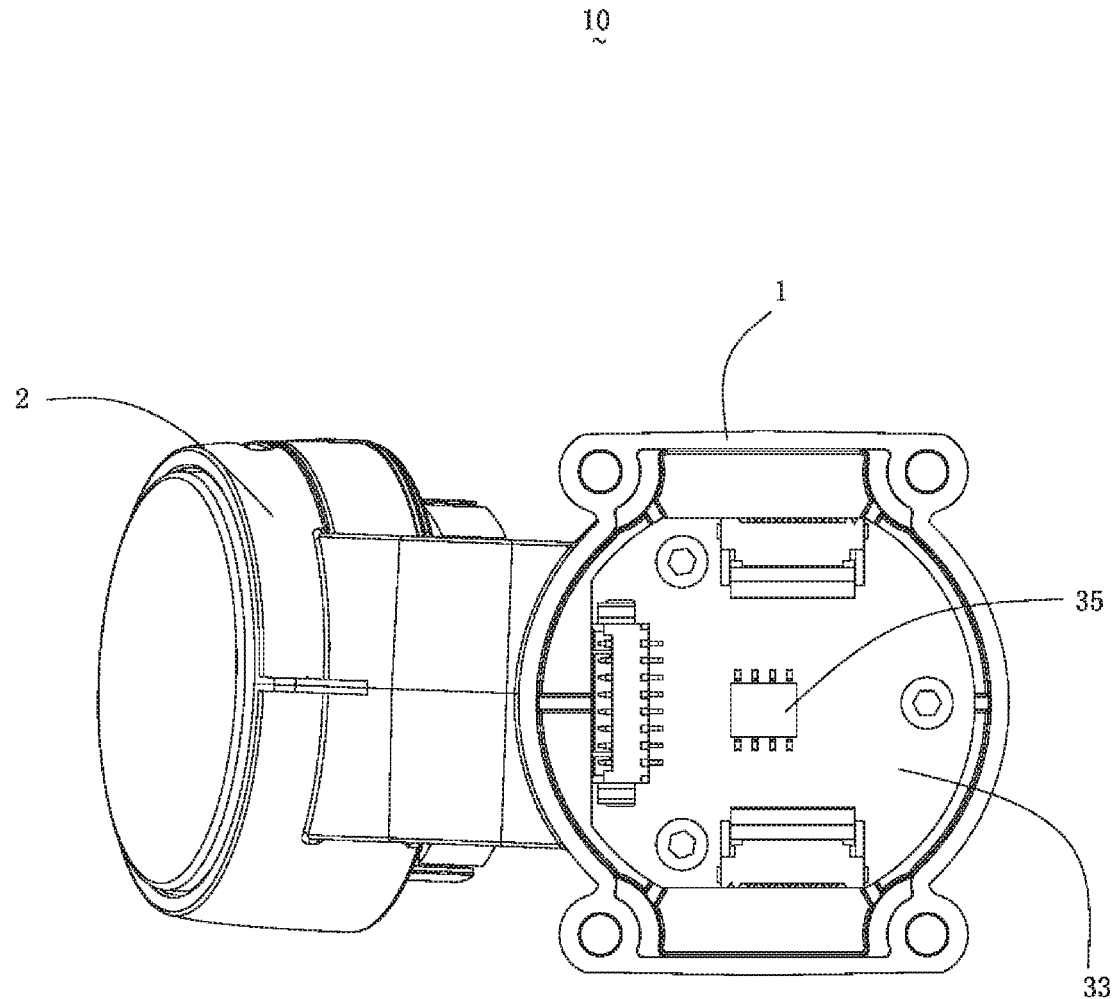
FIG. 4 is a perspective view of FIG. 2 from another angle of view, from which the first rotating member is partially omitted.

As illustrated in FIG. 1 to FIG. 4, in some embodiments of the disclosure, an image capturing device 100 may comprise a gimbal 10 and a payload 20 carried on the gimbal 10. The gimbal 10 comprises a first rotating member 1, a second rotating member 2 rotatably connected with one end of the first rotating member 1 and being configured to carry the payload 20, and a motor 30 connecting the first rotating member 1 with the second rotating member 2. In this embodiment, the payload 20 is a camera. The motor 30 is configured to drive the second rotating member 2 to rotate with respect to the first rotating member 1.

The motor 30 comprises a stator 31 fixed on the first rotating member 1, a rotator 32 rotatably connected with the stator 31 and fixed on the second rotating member 2, an electrical connecting device 33 fixed on the first rotating member 1 and providing an electric signal to the stator 31, a magnet 34 fixed on the rotator 32 and a Hall angular displacement sensor 35 fixed on the electrical connecting device 33 and arranged opposite to the magnet 34. The magnet 34 and the Hall angular displacement sensor 35 may operate together to detect relative positions of the rotator 32 with respect to the stator 31 of the motor 30. The magnet 34 and the Hall angular displacement sensor 35 are spaced from each other by the electrical connecting device 33.

The rotator 32 comprises a rotating shaft assembly 36 rotatably connected with the stator 31 and a rotor 37 fixed on the rotating shaft assembly 36. The rotor 37 is received in the second rotating member 2. In this embodiment, the stator 31 is a coil, and the rotor 37 is a magnet that generates a magnetic force with the stator 31. In an alternative embodiment, the stator 31 may be a magnet, and the rotor 37 may be a coil.

The rotating shaft assembly 36 comprises a rotating shaft 38, and an upper bearing 381 and a lower bearing 382 sleeved respectively on two ends of the rotating shaft 38. One end of the rotating shaft 38 is received in the first rotating member 1, and the other end is received in the second rotating member 2. The upper bearing 381 is received in the first rotating member 1. The lower bearing 382 is received in the second rotating member 2. The rotating shaft assembly 36 rotatably connects the first rotating member 1 with the second rotating member 2 through the rotor 37 and the stator 31. The magnet 34 is fixed on the rotating shaft 38 and arranged to face the electrical connecting device 33 which is received in the first rotating member 1.

The electrical connecting device 33 may be a printed circuit board (PCB) or a flexible circuit board. The electrical connecting device 33 comprises a first surface 331 and a second surface 332 opposite to the first surface 331. The Hall angular displacement sensor 35 may be fixed on the first surface 331, and the magnet 34 is arranged opposite to the second surface 332, such that the magnet 34 does not come into contact with the Hall angular displacement sensor 35. When the Hall angular displacement sensor 35 senses a positional relationship between the stator 31 and the rotator 32, the Hall angular displacement sensor 35 has a small volume; therefore the problem of great frictional resistance of conventional detection modes can be solved.

In some embodiments, in the image capturing device 100, the magnet 34 is fixedly connected with the rotator 32, and the electric connecting devices 33 provided with the Hall angular displacement sensor 35 is fixedly connected with the stator 31. The Hall angular displacement sensor 35 detects a rotational angle of the rotor 37 with respect to the stator 31, forming an angular displacement sensing manner which is of a non-contact type but has an effect equivalent to that of an absolute position encoder. The working resistance of the gimbal 10 is effectively reduced, and the response of the gimbal 10 is increased.

Furthermore, the stator 31 may be fixed directly on the first rotating member 1, and the rotator 32 may be fixed directly on the second rotating member 2, such that the stator 31 and the rotator 32 may be embedded directly into internal space of the first rotating member 1 and the second rotating member 2 and integrated with the first rotating member 1 and the second rotating member 2, effectively reducing an overall size of the gimbal 10.

The foregoing disclosure is merely illustrative of some embodiments of the disclosure, and the scope of the disclosure is not limited thereto. Any equivalent modifications or variations made by those of ordinary skill in the art according to the disclosure of the invention shall fall into the protection scope as defined in the appended claims.

What is claimed is:

1. A motor assembly, comprising:
    a stator coupled to a first rotating member;
    a rotator coupled to a second rotating member and rotatably connected with the stator, the rotator comprising a rotating shaft with a magnet disposed on a first end of the rotating shaft and a rotor directly fixed to a second end of the rotating shaft, wherein the stator is located between the magnet and the rotor in a length direction of the rotating shaft;
    an electrical connecting device in the first rotating member and configured to provide power to the motor assembly for driving the second rotating member to rotate with respect to the first rotating member; and
    a Hall angular displacement sensor disposed on a side of the electrical connecting device that faces away from the magnet, wherein the Hall angular displacement sensor is configured to detect a positional relationship between the first rotating member and the second rotating member.

2. The motor assembly of claim 1, wherein the rotor surrounds at least a portion of the stator.

3. The motor assembly of claim 1, wherein the electrical connecting device is a printed circuit board or a flexible circuit board.

4. The motor assembly of claim 1, wherein the electrical connecting device is further configured to:
    transmit a control signal to control a rotational angle of the rotor with respect to the stator for adjusting the positional relationship between the first rotating member and the second rotating member.

5. The motor assembly of claim 1, wherein the rotating shaft further comprises an upper bearing and a lower bearing, wherein the upper bearing is configured to sleeve an upper end of the rotating shaft and the lower bearing is configured to sleeve a lower end of the rotating shaft.

6. The motor assembly of claim 5, wherein the upper bearing is received in the first rotating member and the lower bearing is received in the second rotating member.

7. A method of detecting the positional relationship between the first rotating member and the second rotating member of the motor assembly of claim 1, comprising:
    detecting, by the Hall angular displacement sensor, a magnetic field strength generated by the magnet;
    determining a rotational angle of the rotor with respect to the stator based on the detected magnetic field strength; and
    determining the positional relationship between the first rotating member and the second rotating member based on the rotational angle of the rotor with respect to the stator.

8. The method of claim 7, wherein the rotor surrounds at least a portion of the stator.

9. The method of claim 7, wherein the electrical connecting device is configured to provide power to the motor assembly to drive the second rotating member to rotate with respect to the first rotating member.

10. The method of claim 7, wherein the electrical connecting device is a printed circuit board or a flexible circuit board.

11. The method of claim 7, further comprising:
adjusting the positional relationship between the first rotating member and the second rotating member using a control signal transmitted via the electrical connecting device to control the rotational angle of the rotor with respect to the stator.

12. The method of claim 7, wherein the rotating shaft further comprises an upper bearing and a lower bearing, wherein the upper bearing is configured to sleeve an upper end of the rotating shaft and the lower bearing is configured to sleeve a lower end of the rotating shaft.

13. The method of claim 12, wherein the upper bearing is received in the first rotating member and the lower bearing is received in the second rotating member.

14. An unmanned aerial vehicle (UAV), comprising:
a main body;
a payload; and
a gimbal supporting the payload, the gimbal comprising a first rotating member, a second rotating member, and a motor assembly configured to drive the second rotating member to rotate with respect to the first rotating member, wherein the motor assembly comprises:
a stator coupled to the first rotating member;
a rotator coupled to the second rotating member and rotatably connected with the stator, the rotator comprising a rotating shaft with a magnet disposed on a first end of the rotating shaft and a rotor directly fixed to a second end of the rotating shaft, wherein the stator is located between the magnet and the rotor in a length direction of the rotating shaft;
an electrical connecting device in the first rotating member and configured to provide power to the motor assembly for driving the second rotating member to rotate with respect to the first rotating member; and
a Hall angular displacement sensor disposed on a side of the electrical connecting device that faces away from the magnet, wherein the Hall angular displacement sensor is configured to detect a positional relationship between the first rotating member and the second rotating member.

15. The UAV of claim 14, wherein the electrical connecting device is a printed circuit board or a flexible circuit board.

16. The UAV of claim 14, wherein the electrical connecting device is further configured to:
transmit a control signal to control a rotational angle of the rotor with respect to the stator for adjusting the positional relationship between the first rotating member and the second rotating member.

17. The UAV of claim 14, wherein the rotating shaft further comprises an upper bearing and a lower bearing, wherein the upper bearing is configured to sleeve an upper end of the rotating shaft and the lower bearing is configured to sleeve a lower end of the rotating shaft.

18. The UAV of claim 17, wherein the upper bearing is received in the first rotating member and the lower bearing is received in the second rotating member.

19. The UAV of claim 14, wherein the payload is supported by the second rotating member of the gimbal, and wherein the motor assembly is configured to drive the second rotating member to rotate with respect to the first rotating member for adjusting an attitude of the payload.

20. The UAV of claim 14, wherein the payload is a sensor or an image capturing device.

* * * * *